No. 751,575. PATENTED FEB. 9, 1904.
C. H. VEEDER.
STEERING MECHANISM FOR MOTOR VEHICLES.
APPLICATION FILED SEPT. 2, 1903.
NO MODEL.
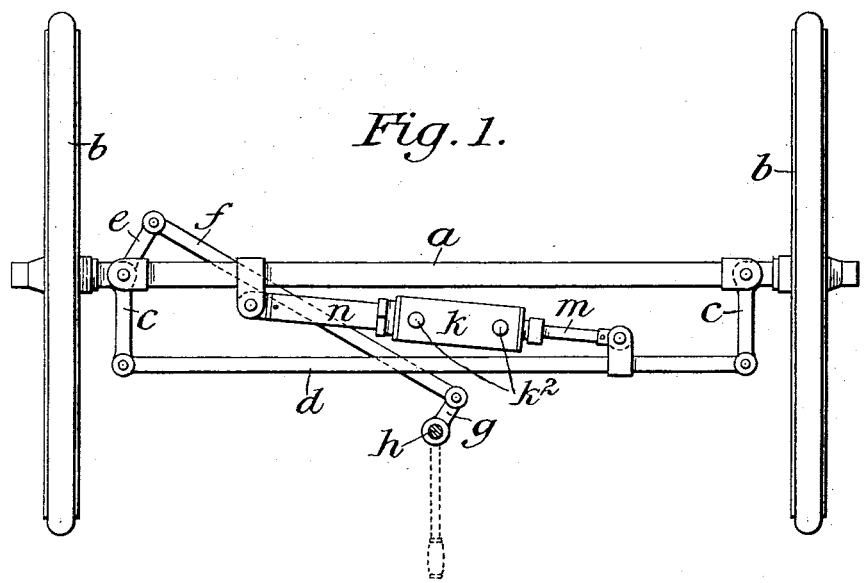
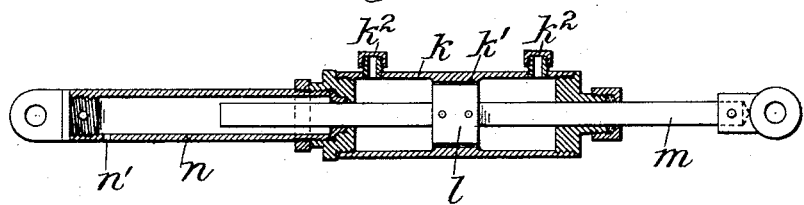

No. 751,575. Patented February 9, 1904.

UNITED STATES PATENT OFFICE.

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

STEERING MECHANISM FOR MOTOR-VEHICLES.

SPECIFICATION forming part of Letters Patent No. 751,575, dated February 9, 1904.

Application filed September 2, 1903. Serial No. 171,660. (No model.)

*To all whom it may concern:*

Be it known that I, CURTIS HUSSEY VEEDER, a citizen of the United States, residing in the city of Hartford, in the county of Hartford, in the State of Connecticut, have invented certain new and useful Improvements in Steering Mechanism for Motor-Vehicles, of which the following is a specification, reference being had to the accompanying drawings, forming a part hereof.

It is well understood that in the use of the ordinary forms of steering mechanism for motor-vehicles it is necessary for the driver to keep a firm grasp at all times upon the steering wheel or handle lest the wheels should be turned suddenly to one side or the other through striking some obstruction on the road-surface.

It is the object of this invention to provide a device which can be applied readily to any ordinary steering mechanism and in use shall act to prevent any sudden deflection of the steering-wheels from their proper course without materially increasing the force necessary to deflect them to one side or the other as may be desired from time to time in the proper steering of the vehicle. Furthermore, the device is so constructed as to be operative under all conditions, even though an inelastic fluid be employed, and is also constructed in such a manner as to have considerable check-power against accidental deflection of the wheels when the vehicle is running straight, while the checking-power is considerably reduced and the steering-lever is therefore manipulated with greater ease when the steering-lever is moved past the center in either direction, as when turning corners.

The invention will be more fully described hereinafter with reference to the accompanying drawings, in which it is illustrated in a convenient and practical form, and in which—

Figure 1 is a plan view showing the front axle and independent steering-wheels of a motor-vehicle with their connections and with the improved hydraulic check applied thereto. Fig. 2 is a detail view in longitudinal section illustrating the construction of the improved check.

As indicated hereinbefore, the improved check is adapted to be applied to any ordinary steering mechanism, such as that represented in Fig. 1 of the drawings, in which the front axle or front transverse member $a$ of the running-frame is shown as supporting the independent steering-wheels $b$ at its ends, the latter being mounted upon the stud-axles forming part of the steering-knuckles $c$, which are pivoted at the ends of the member $a$, as usual, and may be connected by a link $d$. One of the steering-knuckles $c$ may be provided, as is sometimes done, with an arm $e$, which is connected by a link $f$ with an arm $g$ on the steering-shaft $h$, the latter being provided, as usual, with a steering lever or wheel suitably placed above the floor of the vehicle-body for operation by the driver. As will be readily understood, the improved hydraulic check may be variously applied to the steering mechanism, whether it be of the particular form shown in the drawings or of some other well-known or suitable form.

The device comprises a hydraulic cylinder $k$, within which is arranged a piston $l$. The piston-rod $m$, which carries the piston, is extended through the opposite ends of the cylinder, so that the displacement of the liquid within the cylinder shall be the same on the opposite sides of the piston, and one end of the piston-rod is connected to a movable member of the steering mechanism, as to the link $d$, while the piston is connected to an oppositely-moving or relatively stationary part, as the axle $a$, or vice versa, the connections being pivoted or otherwise arranged so as to permit relative movement of the parts without binding. As shown in the drawings, the cylinder $k$ is so connected by a tubular arm $n$, which incloses the corresponding end of the piston-rod $m$, being provided with a suitable vent $n'$. The piston $l$ has a free or loose fit within the cylinder, so that displacement of the liquid within the cylinder from one side of the piston to the other is permitted, the freedom of movement of the piston within the cylinder being therefore determined by the clearance between the piston and the cylinder-wall. It will be understood that the piston is moved within the cylinder by the deflection of the wheels and that resistance to such deflection is determined by the resistance to displacement of the liquid within the cylinder from one side of the piston to the other. As it is desirable that the greatest resistance to the movement of the piston shall be offered when the vehicle is running straight and the piston is then in the middle of the cylinder, if the parts be so arranged, while the wheels should be moved with greater ease when the steering-handle has passed the center in either direction, as in turning corners, the cylinder is constricted slightly, as at $k'$, to give less clearance between the piston and its wall at that point than at either side thereof. Hence while considerable resistance to accidental deflection of the wheels is offered when the vehicle is running straight and corresponding pressure on the steering-lever is required when the vehicle is at first turned from a straight path considerably less pressure is necessary when the steering-lever has once passed the center, so that when it is necessary to make a sharp turn the steering-lever may be manipulated with ease. Suitable filling-heads $k^2$ may be provided on the cylinder for convenience in the introduction of the liquid and the complete expulsion of the air when preparing the device for use. It will be observed that the cylinder has no communication with any other vessel or system of pipes, but is completely closed except for the stuffing-boxes through which the piston-rod is extended, provision being made for the passage of liquid from one side of the piston to the other.

The operation of the improved check has been clearly indicated in connection with the description of the construction thereof, and no further explanation of the operation is necessary.

I claim as my invention—

1. The combination with a steering mechanism for motor-vehicles of a hydraulic check therefor comprising a cylinder and a piston connected to different parts of the steering mechanism, the piston-rod being extended through opposite ends of the cylinder whereby the displacement of the fluid within the cylinder is due only to the movement of the piston, said cylinder being completely closed except for the passage of the piston-rod while provision is made for the passage of liquid from one side of the piston to the other, substantially as described.

2. The combination with a steering mechanism for motor-vehicles of a hydraulic check therefor comprising a cylinder and a piston connected to different parts of the steering mechanism, the cylinder being contracted at a middle point to give less clearance between the piston and the wall of the cylinder at such point than elsewhere in the movement of the piston, substantially as described.

3. The combination with a steering mechanism for motor-vehicles of a hydraulic check therefor comprising a cylinder and a piston connected to different parts of the steering mechanism, the piston-rod being extended through opposite ends of the cylinder and inclosed within the tubular member forming the connection between the cylinder and the corresponding part of the steering mechanism, substantially as described.

This specification signed and witnessed this 28th day of August, A. D. 1903.

CURTIS HUSSEY VEEDER.

In presence of—
Wm. B. Dunning,
E. G. Biddle.